April 12, 1966     A. W. WILSON ET AL     3,245,207

CHROMATOGRAPHIC COLUMN

Filed Oct. 23, 1961

INVENTORS:
ALFRED W. WILSON
ERNEST W. BURTON
JOHN D. GOESCHL

ATTORNEYS

United States Patent Office 3,245,207
Patented Apr. 12, 1966

3,245,207
CHROMATOGRAPHIC COLUMN
Alfred W. Wilson, Ernest W. Burton, and John D. Goeschl, Davis, Calif., assignors to The Regents of The University of California, Berkeley, Calif.
Filed Oct. 23, 1961, Ser. No. 146,867
2 Claims. (Cl. 55—197)

This invention relates to and in general has for its object the provision of a chromatographic column.

Chromatography is the technique by which different materials can be spacially separated on an adsorbent. Gas-liquid chromatography utilizes the differential solubility or adsorptivity of the components of a chemical mixture in or on the surface of another chemical. Instrumentally, the sample to be tested is vaporized by heat if it is not already a vapor, and then swept by an inert gas, usually helium or nitrogen, through a column. The column contains another chemical, the stationary phase, deposited on the inner surface of the column itself, or on a material with which the column is packed. The components of the sample travel through the column at varying rates, depending on their affinities for the stationary liquid phase in the column, emerge separately from the column, in order of increasing affinity, and are measured by special detectors. Detector output signals are recorded as peaks on a strip chart recorder.

The common capillary columns currently in use are many times better in separating efficiency than the classical packed gas-liquid chromatographic column. Capillary performance is characterized by high resolution, high speed of analysis, and wide dynamic range. Small sample concentrations in the column and lower capacity ratios permit operation at lower temperature (a useful feature when high boilers are analyzed) and component elution times are short, thereby cutting total analysis time. The capillary column itself is generally a compact spiral wound capillary tube with an inside diameter of about 0.010 inch. The length varies from 100 to 350 feet (in common use). Capillary columns not only differ in diameter from the ¼-inch packed type chromatographic column, but also in the manner of deposition of the stationary liquid phase. In a packed column, the liquid phase is coated on the surfaces of the granules of an inert support such as diatomaceous earth, usually in a ratio of 15 to 20% by weight. The column is then filled with this coated material. In the case of capillary columns, the stationary liquid phase is deposited as a thin film on the inside wall of the capillary tube, eliminating band spreading due to packing inhomogeneities. No solid support material is used with these columns.

With columns of such small diameter, frequent stoppages are encountered.

More specifically, one of the objects of this invention is the provision of a chromatographic column, a first cylinder, and a second cylinder circumscribing the first cylinder with a gas-tight fit, the closed surface of one of said cylinders being provided with a helical groove, one end of said groove terminating in an inlet fitting and the other end of said groove terminating in an outlet fitting.

Another object of this invention is the provision of a chromatographic column of the character above described provided with a valve for selectively connecting one of said fittings with predetermined spaced points along the length of said groove.

Still another object of this invention is the provision of a chromatographic column of the character above described wherein the engaging surfaces of said cylinders are formed on a taper, and wherein said helical groove is formed on the outer surface of the inner cylinder.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings.

Figure 1:
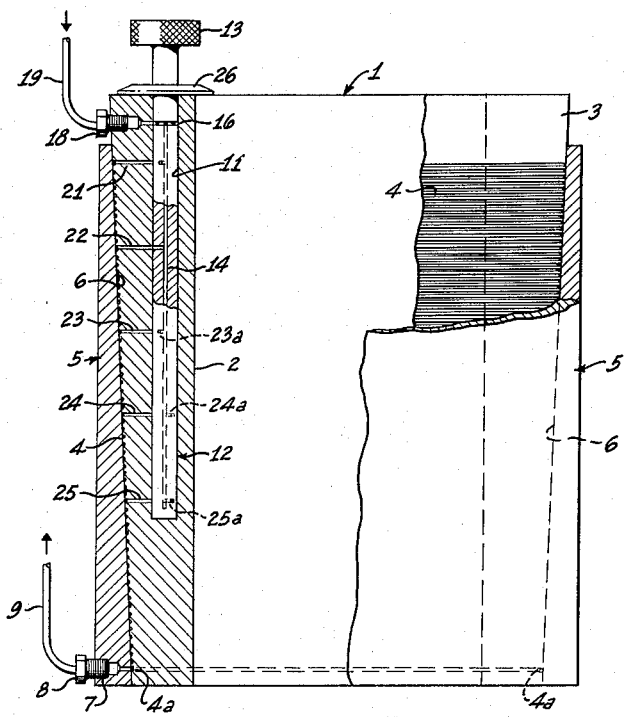
FIG. 1 is a side elevation of a chromatographic column embodying the objects of our invention with portions thereof partly in section so as to better illustrate its construction.
Figure 2:
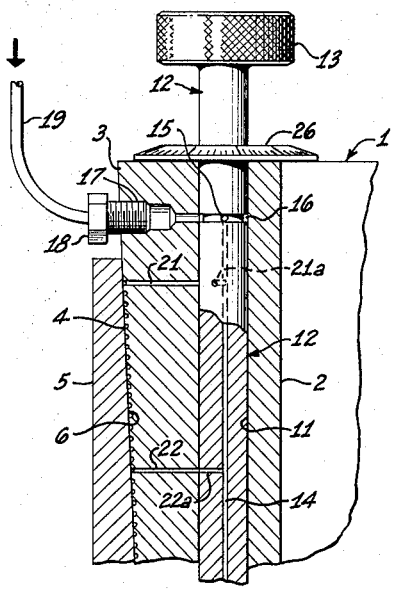
FIG. 2 is an enlarged fragmentary detail of the upper left-hand corner of FIG. 1.

The column illustrated in these two figures includes an inner hollow metal member generally designated by the reference numeral 1 having a straight cylindrical inner wall 2 and an outer wall 3 forming the surface of a frustum of a cone to form a slight taper. As best shown in FIG. 1, the tapered wall 3 is provided with a continuous helical groove 4 conveniently made of semicircular cross-section so that it can be readily cleaned. As shown in FIG. 1, the lower end of the groove 4 terminates in an annular channel 4a.

Closing the outer grooved face of the member 1 is a member 5 having an inner face 6 formed on a taper identical to that of the wall 3. As a result of this structure the two members can be readily forced together into a gas-tight fit, thereby to close the helical groove 4 and thus provide a continuous gas-tight helical column. By uncoupling the two members, the groove 4 is exposed and can be readily cleaned.

Extending radially into the lower end of the member 5 is a tapped bore 7 communicating with the lower closed end of the groove 4 through the annular channel 4a, and threaded into the outer end of this bore is an outlet fitting 8 connected to a conduit 9.

Extending into the upper end of the wall of the inner member 1, preferably coaxially therewith, is a straight bore 11, and rotatably mounted therein is a valve cylinder 12 terminating at its upper end in a knurled thumb screw 13. Formed in the valve cylinder 12 is an axial manifold conduit 14 communicating at its upper end through a radial hole 15 with an annular channel 16 formed in the valve cylinder 12.

Extending through the wall of the inner member 1 in radial alignment with the channel 16 is a tapped bore 17, and threaded therein is an inlet fitting 18 connected with a vapor inlet line 19. By means of this expedient, communication between the line 19 and the axial conduit 14 is always maintained regardless of the angular position of the valve cylinder 12.

Formed in the wall of the inner member 1 at spaced points along its length are a series of transverse passageways 21 through 25 inclusive, each communicating at its outer end with the helical groove 4 at a different point along its length. Extending through the valve cylinder 12 on the level of each of the passageways 21 through 25 are radial holes 21a through 25a, each such hole being angularly offset from the next preceding hole by a predetermined increment. If, as shown for purposes of illustration, there are five radial holes 21a through 25a, then the angle subtended by each adjacent pair of such radial holes can be 72°. The setting of the valve cylinder 12 can then be indicated by a calibrated dial 26 fixed to the cylinder and operating against a fiducial line or point inscribed on the upper end of the inner member 1. By resorting to this expedient the effective length of the chromatographic column formed by the helical groove 4 can be varied at will in known increments, the pitch of the groove and the vertical distance between the transverse passageways 21–25, of course, being known.

Depending upon the cross-sectional area of the helical groove 4, the above device can be used either as a packed gas-liquid chromatographic column or as a capillary column. For use as a packed column the cross-sectional area of the groove 4 should have a diameter in the order of ¼ inch, whereas when used as a capillary column the diameter of the groove 4 should be in the order of 0.005 to 0.010 inch.

The outer diameter of this device can be in the order of 5 inches and its length in the order of 4½ inches, although there is nothing critical in these dimensions.

In a packed column the function of the packing, which usually takes the form of a solid adsorbent, is to serve as a mechanical support of large surface area for the stationary liquid phase.

When using a capillary column the need for a stationary support is dispensed with, for the liquid phase is distributed as an even coating over the walls of the column, and in columns such as this there is a tremendous increase in the resolving capacity over and above packed columns. By way of comparison, it may be noted that chromatographic columns of ¼-inch diameter packed with a solid support coated with a liquid generally having a separating efficiency in the order of 1,000 to 2,000 theoretical plates for a column 10 feet in length. In contrast to this, a 100-foot capillary column having a 0.010-inch diameter, with the liquid distributed on the walls of the capillary, frequently exhibits a theoretical plate value in the order of 25,000–50,000.

However, capillary columns of the type previously used are subject to breakage, are difficult to clean, and cannot well be adjusted in length. In contrast to this, our column, as above described, can be easily manufactured, easily assembled, dismantled and cleaned, and its length can be selectively varied at will at least within the limitations of the dimensions of the device.

We claim:
1. A chromatographic column which comprises:
  (a) an inner member having an outer surface defining a frustum of a cone and a helical groove;
  (b) an outer member having an inner surface defining a frustum of a cone similar to said frustum defined by said outer surface of said inner member;
  (c) a valve member;
  (d) inlet means communicating with said valve member,
  (e) outlet means spaced from said inlet means communicating with said helical groove, and
  (f) means for selectively connecting various lengths of said helical groove to said valve member.
2. A chromatographic column which comprises:
  (a) an inner member having
     an outer surface defining a frustum of a cone and a helical groove,
     a first bore disposed substantially parallel to the axis of said frustum, and
     a series of spaced passageways extending from said bore to said helical groove;
  (b) an outer member having an inner surface defining a frustum of a cone similar to said frustum defined by said outer surface of said inner member;
  (c) a valve cylinder disposed within said first bore and having
     means for rotation thereof,
     an axially disposed conduit,
     a series of spaced angularly-offset radially disposed holes communicating respectively with said series of spaced passageways and said axial conduit as said valve cylinder is rotated,
     means exterior of said valve cylinder for indicating said angular offset for each of said holes;
  (d) inlet means communicating with the exterior of said members and said conduit; and
  (e) outlet means remote from said series of said spaced passageways communicating with the exterior of said members and said helical groove and spaced from said inlet means.

References Cited by the Examiner
UNITED STATES PATENTS

| | | | |
|---|---|---|---|
| 2,303,111 | 11/1942 | Cuyler et al. | 73—401 |
| 2,981,092 | 4/1961 | Marks. | |
| 3,016,107 | 1/1962 | Strange et al. | 55—67 |
| 3,149,941 | 9/1964 | Barnitz et al. | 55—386 |
| 3,150,517 | 9/1964 | Kupfer et al. | 55—386 |

FOREIGN PATENTS 1,113,319 8/1961 Germany.

OTHER REFERENCES

Ambrose, D. and B.: Gas Chromatography, London, George Newnes, 1961, page 194, Fig. 90, QD 271 A5.

REUBEN FRIEDMAN, *Primary Examiner.*

HERBERT L. MARTIN, *Examiner.*